United States Patent
D'Amico et al.

(10) Patent No.: US 12,398,759 B2
(45) Date of Patent: Aug. 26, 2025

(54) BEARING UNIT WITH ROLLING BODIES

(71) Applicant: AKTIEBOLAGET SKF, Gothenburg (SE)

(72) Inventors: Giorgia D'Amico, Turin (IT); Gianni Alvise Cognolato, Trofarello (IT); Claudio Foti, Villanova d'asti (IT)

(73) Assignee: AKTIEBOLAGET SKF, Gothenburg (SE)

( * ) Notice: Subject to any disclaimer, the term of this patent is extended or adjusted under 35 U.S.C. 154(b) by 124 days.

(21) Appl. No.: 18/348,609

(22) Filed: Jul. 7, 2023

(65) Prior Publication Data
US 2024/0019000 A1    Jan. 18, 2024

(30) Foreign Application Priority Data
Jul. 15, 2022   (IT) .................. 102022000014854

(51) Int. Cl.
*F16C 33/78*   (2006.01)
*F16C 19/06*   (2006.01)

(52) U.S. Cl.
CPC ........... *F16C 33/783* (2013.01); *F16C 19/06* (2013.01)

(58) Field of Classification Search
CPC .. F16C 33/7826; F16C 33/783; F16C 33/784; F16C 33/7843; F16C 33/7853; F16C 33/7856
See application file for complete search history.

(56) References Cited

U.S. PATENT DOCUMENTS

| | | | |
|---|---|---|---|
| 3,709,572 A | * | 1/1973 | Pethis .................. F16C 33/783 277/369 |
| 4,428,629 A | | 1/1984 | Colanzi et al. |
| 9,581,201 B2 | | 2/2017 | Hartling et al. |

FOREIGN PATENT DOCUMENTS

| | | | | |
|---|---|---|---|---|
| EP | 2990674 A1 | * | 3/2016 | ............ F16C 33/768 |
| IT | TO930707 A1 | | 3/1995 | |

OTHER PUBLICATIONS

Written Opinion and Search Report from the Italian Patent Office mailed Jan. 3, 2023 in related application No. IT102022000014854, and translation thereof.

* cited by examiner

*Primary Examiner* — James Pilkington
(74) *Attorney, Agent, or Firm* — J-TEK LAW PLLC; Scott T. Wakeman; Mark A. Ussai (57) ABSTRACT

A bearing unit includes rolling bodies between radially inner and outer rings and a seal element extending between the rings, the seal element including a metallic shield and an elastomeric coating overmolded on the shield. The coating includes an anchor body mounted in a seat of the outer ring, and the anchor body includes a first anchor lip on an axially inner side of the anchor body contacting the seat of the radially outer ring and a second anchor lip located on an axially outer side of the anchor body contacting and forming a seal at a location on the radially outer ring. A concave radially outwardly facing connecting surface extends from the first anchor lip to the second anchor lip and is configured to reduce a compression of the anchor body when the anchor body is inserted into the seat.

15 Claims, 5 Drawing Sheets

BEARING UNIT WITH ROLLING BODIES

CROSS-REFERENCE

This application claims priority to Italian patent application no. 10 2022 000014854 filed on Jul. 15, 2023, the contents of which are fully incorporated herein by reference.

TECHNOLOGICAL FIELD

The present disclosure is directed to a bearing unit with rolling bodies and having a seal element. Such a bearing unit is suitable in particular for use in the food and beverage industry.

BACKGROUND

Bearing units having rolling elements or bodies which, as is known, are used to allow relative movement between one component or group and another component or group, are known. The bearing unit generally has a first component, for example a radially outer ring, and a second component, for example a radially inner ring. As is known, the radially inner ring is often rotatable while the radially outer ring is stationary, whereas in other applications the outer ring rotates and the inner ring is stationary. In any case, in roller bearing units, the rotation of one ring with respect to the other is made possible by a plurality of rolling elements positioned between the cylindrical surface of one component and the cylindrical surface of the second component, which cylindrical surfaces are usually referred to as raceways. The rolling elements may be balls, cylindrical or conical rollers, needle rollers and similar rolling elements.

It is also known practice for bearing units to have suitable seal elements (seals or sealing devices) to protect against external contaminants and to create a seal with respect to lubricant. Typically, the seal elements are made up of a shaped shield mounted by interference fit in suitable seats in the rings of the bearing unit, for example the radially outer ring. The shaped shield has an elastomer coating with one or more sealing lips and a protrusion which, in use, is inserted by interference fit, therefore deformably, in the seat of the radially outer ring. The sealing lips may, in use, make frictional contact with other components of the bearing unit, for example with the radially inner ring, which is rotatable. The sealing lips may also be in a "guttering" arrangement, in other words axially external and substantially parallel to one another, so as to create "labyrinth" seals, for example, with the casing containing the bearing unit. Such seal elements must be very efficient both from a functional point of view and in terms of reliability, throughout the entire life of the bearing unit.

One of the drawbacks of known solutions is the procedure for assembling the seal element. To be specific, when the seal element is inserted in the seat in the radially outer ring, the elastomer protrusion is highly compressed and, not having the space necessary to adapt properly to the seat, gives rise to high tension forces that risk causing the seal element to come out of the seat in the outer ring. In particular, it is difficult to implement a seal element according to the prior art in the automatic bearing unit assembly process as solid anchoring of the seal element cannot be obtained.

SUMMARY

It is an aspect of the present disclosure to produce a bearing unit with rolling bodies which does not have the above drawbacks.

In particular, a bearing unit according to the present disclosure comprises a seal element having a new anchoring system for optimizing the automatic assembly process on the production line.

An aspect of the present disclosure unit comprises a bearing unit having a radially outer ring that is stationary, a radially inner ring that is rotatable with respect to an axis of rotation (X), a row of rolling bodies interposed between the radially outer ring and the radially inner ring, and a seal element interposed between the radially inner ring and the radially outer ring. The seal element is stably anchored, in use, in a seat of the radially outer ring and comprises, in turn, a shaped metallic shield and an elastomer coating overmolded on the shaped shield and provided with a radially external anchor body. The anchor body includes a first radially external axially internal anchor lip, a second shaped shield and provided with a radially external anchor body. The anchor body includes a first radially external axially internal anchor lip and a radial external connecting surface. The first anchor lip is configured in use to be stably inserted in the seat of the radially external ring. The second anchor lip configured in use to improve the position in the seat of the seal element and the protection from external contamination, and the connecting surface is located between the first and second anchor lips and is configured to reduce the compression of the anchor body during the assembly process.

Another aspect of the disclosure comprises a bearing unit that includes a radially outer ring configured to be fixed relative to a stationary support, a radially inner ring configured to rotate relative to the radially outer ring about an axis of rotation, a row of rolling bodies between the radially outer ring and the radially inner ring, and a seal element between the radially inner ring and the radially outer ring. The seal element includes a shaped metallic shield and an elastomeric coating overmolded on the shaped metallic shield, and the elastomeric coating includes an anchor body mounted in a seat of the radially outer ring. The anchor body is located radially outward of the shaped metallic shield. The anchor body includes a first anchor lip on an axially inner side of the anchor body that contacts the seat of the radially outer ring, and a second anchor lip located on an axially outer side of the anchor body that contacts and forms a seal at a location on the radially outer ring. A concave, radially outwardly facing first connecting surface is located between the first anchor lip and the second anchor lip and is configured to reduce a compression of the anchor body when the anchor body is inserted into the seat.

In another aspect of the disclosure, the first anchor lip comprises a first protrusion on the axially inner side of the anchor body and a second protrusion located between the first protrusion and the second anchor lip, and the first protrusion is connected to the second protrusion by a second connecting surface. The first protrusion contacts the seat at a first point, the second protrusion contacts the seat at a second point axially and radially outward of the first point, and a first sealed space is defined by the first protrusion, the second protrusion and a portion of the seat between the first point and the second point. Furthermore, the second anchor lip contacts the radially outer ring at a third point axially outward and radially inward of the second point, and a second sealed space is defined by the second protrusion, the second anchor lip and a portion of the radially outer bearing ring between the second point and the third point. A radially outer portion of the second anchor lip lies radially outward of the third point.

BRIEF DESCRIPTION OF THE DRAWINGS

The disclosure will now be described with reference to the attached drawings, which show some non-limiting embodiments of the bearing unit, in which.

DETAILED DESCRIPTION

An embodiment of a bearing unit with rolling bodies according to the present disclosure is described below purely by way of example.

Figure 1:
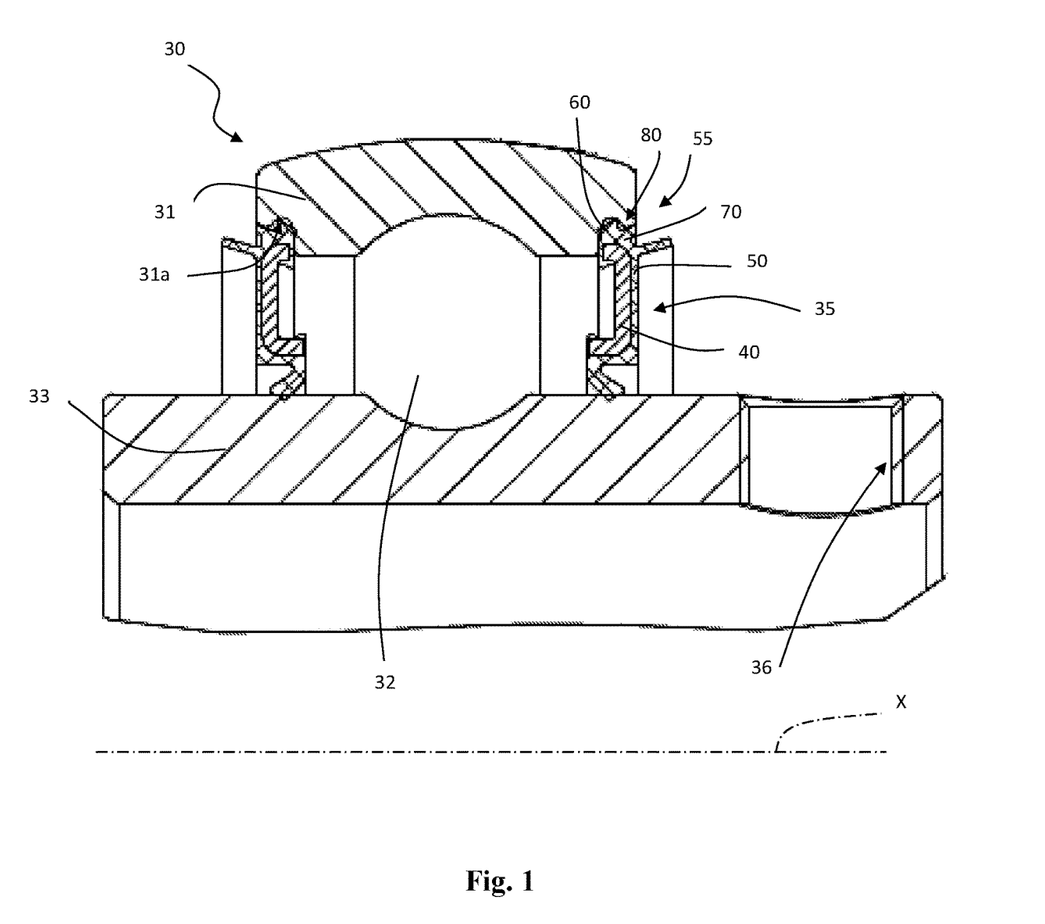
FIG. 1 is a sectional elevational view of a bearing unit with inner and outer rings, rolling bodies between the rings and a seal element including an anchor body according to an embodiment of the present disclosure.

With reference in particular to FIG. 1, the bearing unit 30 for use, preferably but not exclusively, in the food and beverage industry, comprises: a radially outer ring 31, preferably stationary, a radially inner ring 33, preferably rotatable about a central axis of rotation X of the bearing unit 30 and having at least one through hole 36 for receiving a device for attachment (known and therefore not shown in the figures, for example a pair of grub screws or plugs) of the bearing unit 30, specifically the radially inner ring 33, to a machine shaft, and a row of rolling elements 32 interposed between the radially outer ring 31 and the radially inner ring 33.

Throughout the present description and in the claims, terms and expressions indicating positions and orientations, such as "radial" and "axial" are to be understood with reference to the central axis of rotation X of the bearing unit 30. The term "axially inner" refers to a direction toward the rolling elements 32, and the term "axially outer" refers to a direction away from the rolling elements 32.

To simplify the drawings, the reference sign 32 will designate both individual rolling elements and the row of rolling elements. Again for the sake of simplicity, the term "rolling element" will be used to identify any rolling element, namely balls, rollers, conical rollers, needle rollers and the like, without thereby departing from the scope of the present invention.

The bearing unit 30 also has seal elements 35 for sealing off the bearing unit from the external environment.

The seal element 35 is interposed between the radially inner ring 33 and the radially outer ring 31. In use, the seal element 35 is stably anchored in a seat 31a in the radially outer ring 31. The seat 31a includes a groove that is located at the radially inner side of the radially outer ring 31 and has a toroidal surface.

Figure 2:
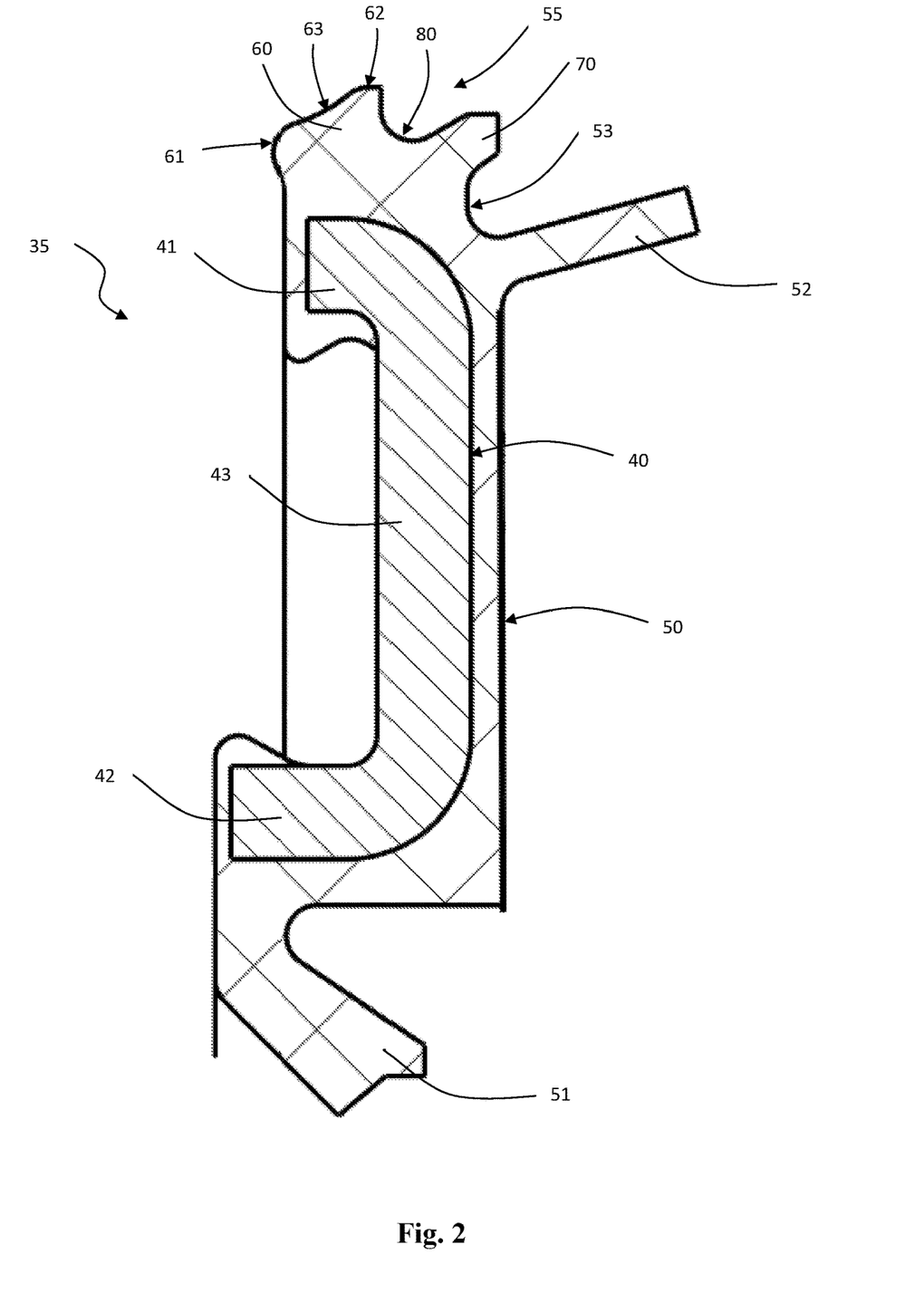
FIG. 2 is an enlarged sectional view of one of the seal elements of FIG. 1.

With reference to FIG. 2, the seal element 35 comprises a shaped metallic shield 40 that forms a support and an elastomer coating 50 overmolded on the shaped shield 40.

In particular, the shaped shield 40 comprises a first radially outer cylindrical portion 41 coaxial with the axis X, a second radially inner cylindrical portion 42, again coaxial with the axis X, and a flange portion 43 connecting the first and second cylindrical portions, which flange extends radially inwards from said first cylindrical portion 41 and transversely to the axis X.

The elastomer coating 50 comprises a contacting lip 51 that extends radially inward from the shaped shield 40 and slidingly contacts the radially inner ring 33 to create a seal by frictional contact with the radially inner ring 33. The elastomer coating 50 also includes at least one non-contacting lip 52 extending axially away from the shaped shield 40 and in a direction away from the rolling elements 32. FIG. 2 shows an embodiment with a single non-contacting lip. However, solutions with several non-contacting lips, in a "guttering" arrangement, in other words axially external and substantially parallel to one another so as to create "labyrinth" seals with a casing (known and therefore not shown in the figures) containing the bearing unit 30 are also known and may be used, and an anchor body 55, radially external of the shaped shield and rigidly secured to the first cylindrical portion 41 of the shaped shield 40, making it possible to stably attach the seal element 35 to the seat 31a in the radially outer ring 31.

The seal element includes an anchor body 55 that extends at least partially into the seat 31a to secure the seal element 35 to the bearing radial outer ring 31. The disclosed anchor body is configured to be more flexible than known elements for attaching a seal element to a bearing ring and to reduce tension forces linked to the deformation of the elastomeric material. The anchor body 55 has a shape which interfaces better with the seat 31a in the radially outer ring 31 and which facilitates assembly in the seat 31a in the radially outer ring 31.

The anchor body 55 includes a first anchor lip 60 that is located radially outward of the shaped shield 40 and on the axially inner side of the seal element 35—that is, the side of the seal element 35 that faces toward the bearing interior where the rolling elements 32 are located. The first anchor lip 60 is configured in use to be stably inserted in the seat 31a of the radially external ring 31. The anchor body 55 also includes a second anchor lip 70 that is located radially outward of the shaped shield 40 and on the axially outer side of the seal element 35—that is, on the side of the seal element that faces away from the bearing interior. The second anchor lip 70 is configured in use to improve the position in the seat 31a of the seal element 35 and to form a seal with the bearing external ring 31 to protect the bearing from external contamination. More specifically, the second lip 70, once placed in its operational anchoring position, becomes for all intents and purposes a static sealing lip on the radially outer ring 31. It also creates a "dynamic seal" by interacting with a groove 53, below the second lip 70, and with the non-contacting lip 52. This affords better protection against the ingress of contaminants both owing to the direct contact itself and owing to the curved shape of the groove 53 which tends to repel contaminants heading for the bearing unit 30. The anchor body 55 also includes a convex connecting surface 80 or groove located radially outward of the shaped shield 40 between the first anchor lip 60 and the second anchor lip 70. The connecting surface 80 is configured to reduce compression during the assembly process, thereby facilitating assembly of the seal element 35 in the seat 31a in the radially outer ring 31. According to a first embodiment of the disclosure, the connecting surface 80 is a toroidal surface. In an alternative embodiment, shown in FIG. 5, the connecting surface 81 is a cylindrical surface.

More specifically, the first anchor lip 60 has an axially inwardly facing first protrusion 61, and a second protrusion 62 located axially and radially outward from the first protrusion 61. A slightly concave conical surface 63 connects the first protrusion 61 to the second protrusion 62 and is configured to reduce the tension on the anchor body 55 during assembly of the seal element 35.

The seat 31a in the radially outer ring 31 has a conical surface 311 located axially inward of the shaped shield 40, a circular surface 312 axially outward of the conical surface 311, and a substantially toroidal surface 313 between the conical surface 311 and the circular surface 312. The radially outer ring 31 also has an edge 31b axially external and radially internal to the seat 31a.

The seal element 35 is assembled in the seat 31a by inserting, in the axially internal direction, the first anchor lip 60, which deforms (specifically, its second protrusion 62 deforms in particular) so as to slide against and pass beyond the edge 31b of the radially outer ring 31. Next, the first anchor lip 60 enters the seat 31a, relaxing and taking up a position, shown schematically in FIG. 3, affording stable anchoring by virtue of the reaction forces exchanged, respectively, between the first protrusion 61 and the conical surface 311 of the seat 31a and between the second protrusion 62 and the circular surface 312 of the seat 31a.

Figure 3:
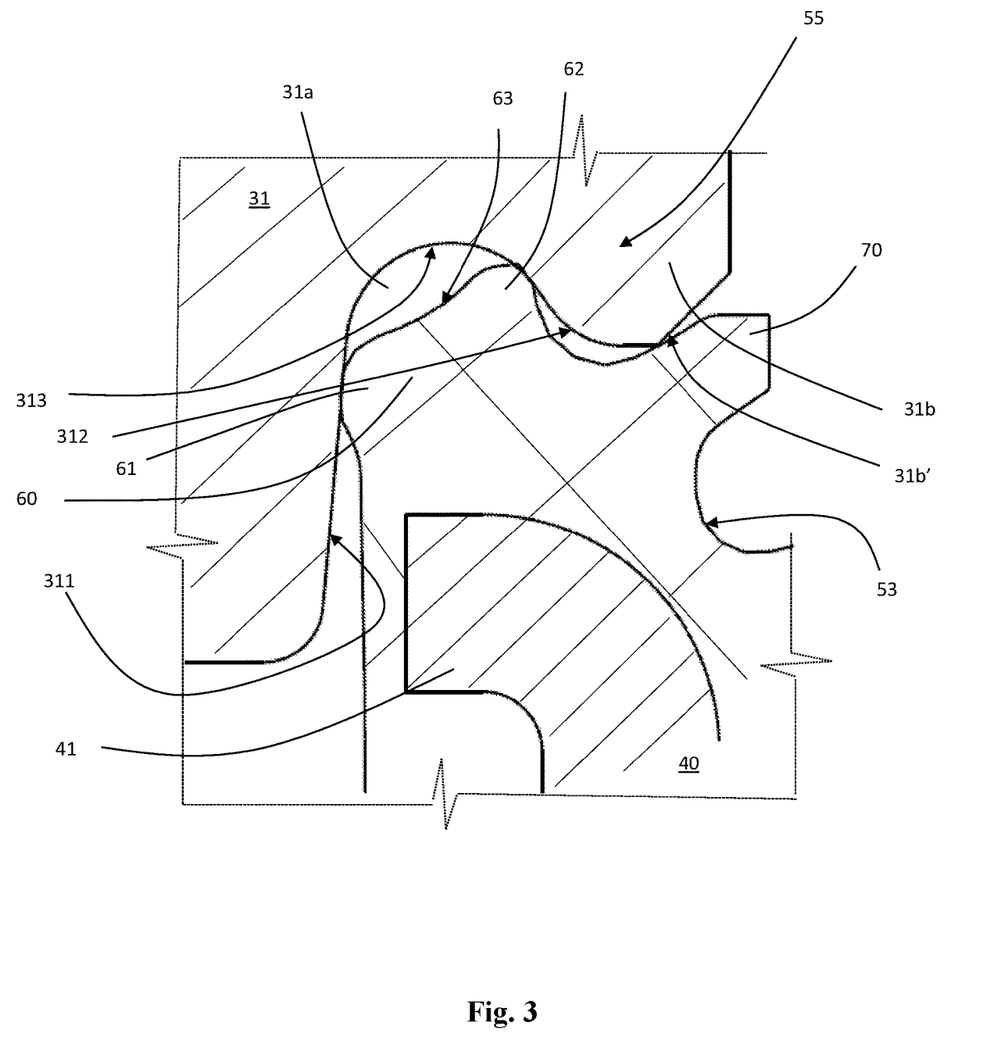
FIG. 3 is a first schematic detail view of the anchor body of the seal element of FIG. 1.

The double-lip design of the anchor body 55 has two simultaneous functions: the first axially internal anchor lip 60 enters the seat 31a in the radially outer ring 31 "gently" and stays rigidly attached to said seat; the second anchor lip 70, which is external, is basically a second protection both for stabilizing the assembly process through the contact with a radially internal conical surface 31b' of the edge 31b of the radially outer ring 31, and for creating a contacting seal with the outer ring against external contaminants.

Therefore, this new shape of the anchor body 55, in particular of the first anchor lip 60, stabilizes the position of the seal element 35 and the forces within the seat 31a in the radially outer ring 31. Furthermore, also by virtue of the conical surface 63, the first anchor lip 60, and therefore the entire anchor body 55, is not subjected to high tension forces that could cause it to come out of the corresponding seat 31a.

It will be understood that, in order to ensure the highest efficiency of this new anchor body 55, it is advantageous to combine this new solution with optimized dimensions.

Figure 4:
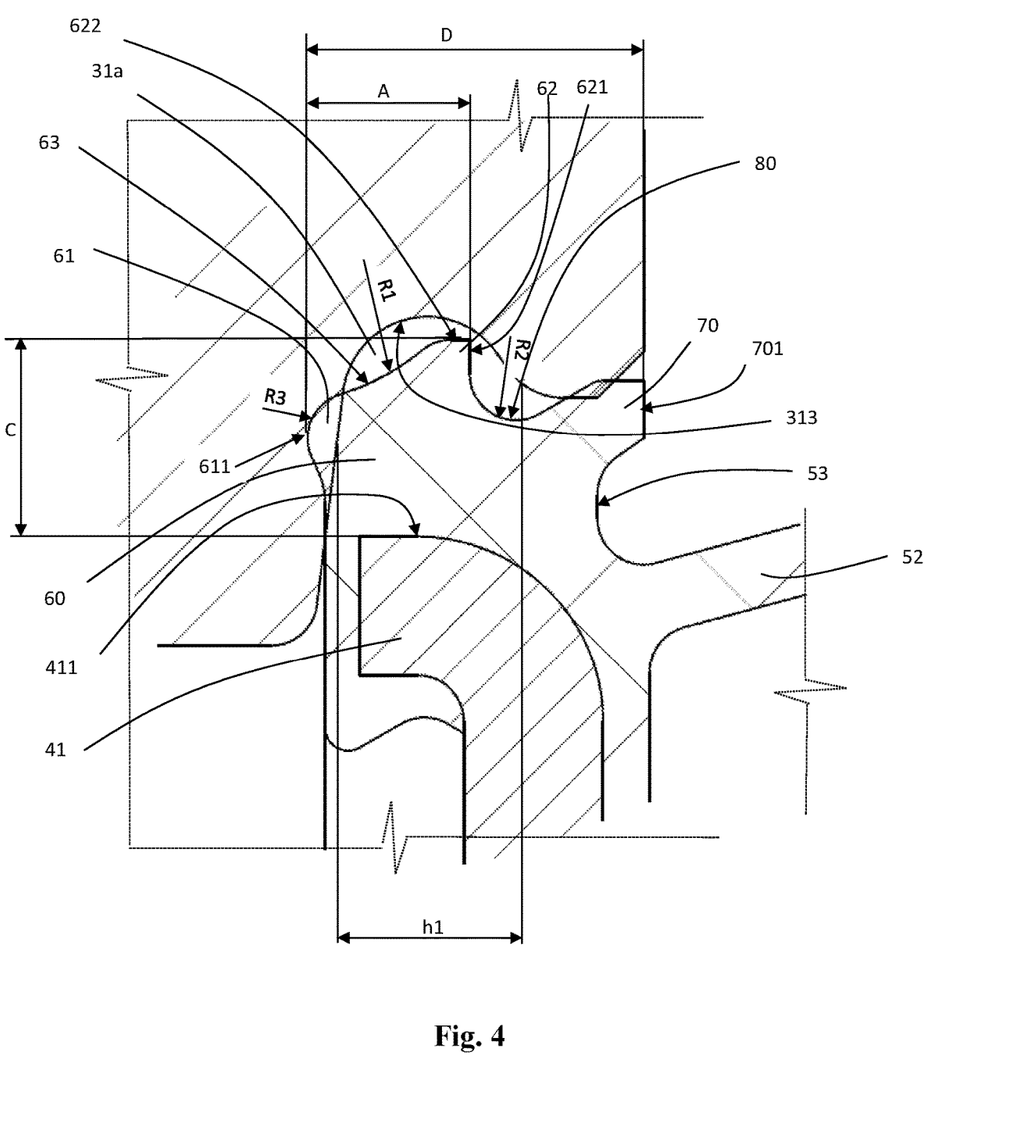
FIG. 4 is a second schematic detail view of the anchor body of the seal element of FIG. 1.

With reference to FIG. 4, as h1 defines the axial width of the seat 31a and in particular of its toroidal central surface 313, the fundamental dimensions of the anchor body 55 may be related directly or indirectly thereto.

The axial width A of the first anchor lip 60, in other words the axial distance from the axially inner edge 611 of the first protrusion 61 to the axially outer edge 621 of the second protrusion 62, may be between $$h1<A<1.1\times h1,$$

wherein higher values would excessively stress the anchor body 55, while lower values would not guarantee sufficient stability of the anchor body in the seat.

The axial width D of the entire anchor body 55, in other words the axial distance from the axially inner edge 611 of the first protrusion 61 to the axially outer edge 701 of the second anchor lip 70, may be between $$2.0\times A<D<2.1\times A$$

wherein higher values would not guarantee a sufficient seal between the second anchor lip 70 and the conical surface 31b' of the edge 31b of the radially outer ring 31, while lower values would excessively stress the second anchor lip 70.

The radial width C of the second anchor lip 70, that is the radial distance between the radially outer surface 411 of the first cylindrical portion 41 of the shaped shield 40 and a cylindrical surface 622, radially external, of the second protrusion 62, may be between $$1.2\times A<C<1.25\times A.$$

In practice, this makes it possible to restrict as far as possible the value of the thickness of elastomer of the first anchor lip 60 and, therefore, the radial height of the entire seal element for better insertion in the seat in the radially outer ring. Higher values than the selected range would make assembly of the seal element more difficult, while lower values would not guarantee optimum production of the two anchor lips 60, 70 for reasons of the production process.

The radius of curvature R1 of the slightly concave conical surface 63 may be between $$1.4\times A<R1<1.45\times A$$

in order to guarantee proper flexibility of the first anchor lip 60.

Figure 5:
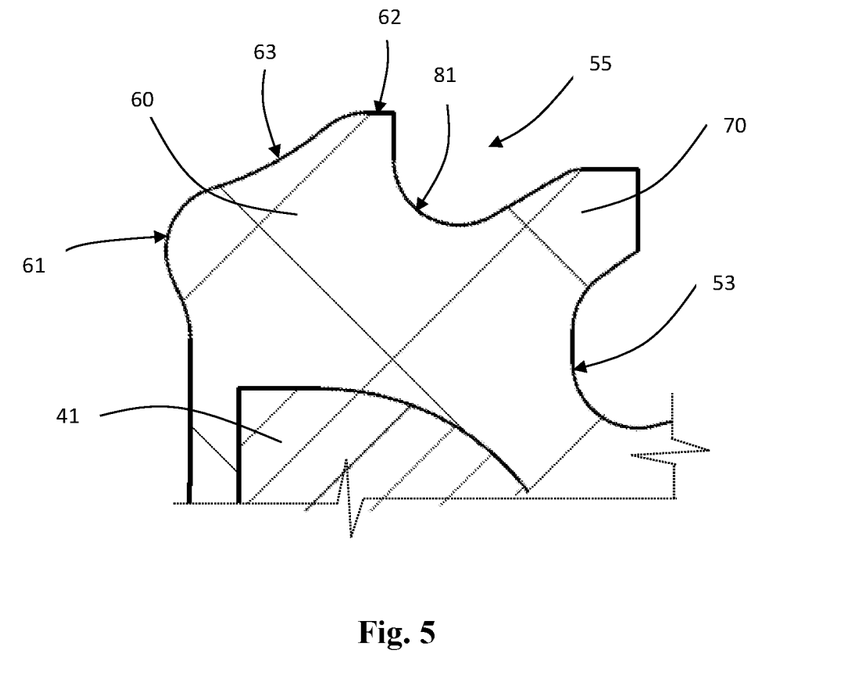
FIG. 5 is a schematic detail view of an alternative embodiment of the anchor body of the seal element of FIG. 3.

The radius of curvature R2 of the radially outer connecting surface 80 between the first anchor lip 60 and the second anchor lip 70 may be between 0.15 mm and 1 mm in order to guarantee proper compression of the first anchor lip 60 towards the connecting surface 80, 81 in such a way as to facilitate insertion of the profile of the anchor body 55 in the seat 31a, during the assembly process.

Lastly, the radius R3 of the axially inner edge 611 of the first protrusion 61 may be between 0.15 mm and 1.5 mm, in order to guarantee correct positioning of the entire seal element 35 in the seat 31a by compressing the two protrusions 61, 62 in such a way as to balance the reaction forces exchanged, respectively, between the first protrusion 61 and the conical surface 311 of the seat 31a and between the second protrusion 62 and the circular surface 312 of the seat 31a.

In summary, the solution proposed by the seal element with an optimized anchor body offers the following advantages:
  improves automatic assembly of the seal element in the bearing unit, preventing it from coming out during application, and also preventing the elastomeric material from being squashed on the edge of the outer ring with consequent tearing of the seal element in the assembly phase,
  generally improves the process for assembling the seal element, preventing it from rotating relative to the radially outer ring,
  does not change the current process for assembling the bearing unit, introducing further assembly steps,
  does not change the seal element as regards the sealing lips, since the changes proposed only affect the anchoring area.

In addition to the embodiments of the invention as described above, it is to be understood that there are numerous other variants. It is also to be understood that said embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing unit comprising:
   a radially outer ring configured to be fixed relative to a stationary support,
   a radially inner ring configured to rotate relative to the radially outer ring about an axis of rotation,
   a row of rolling bodies between the radially outer ring and the radially inner ring,
   a seal element between the radially inner ring and the radially outer ring, the seal element including a shaped metallic shield and an elastomeric coating overmolded on the shaped metallic shield,
   wherein the elastomeric coating includes an anchor body mounted in a seat of the radially outer ring, the anchor body being located radially outward of the shaped metallic shield,
   wherein the anchor body includes a first anchor lip on an axially inner side of the anchor body, the first anchor lip contacting the seat of the radially outer ring,
   a second anchor lip located on an axially outer side of the anchor body, the second anchor lip contacting and forming a seal at a location on the radially outer ring, and
   a radially outwardly facing first connecting surface between the first anchor lip and the second anchor lip configured to reduce a compression of the anchor body when the anchor body is inserted into the seat, the first connecting surface being concave,
   wherein the first anchor lip comprises a first protrusion on the axially inner side of the anchor body and a second protrusion located between the first protrusion and the second anchor lip, and
   wherein the first protrusion is connected to the second protrusion by a second connecting surface.

2. The bearing unit according to claim 1, wherein the second connecting surface is concave.

3. The bearing unit according to claim 2, wherein a radius of curvature of the first connecting surface is less than a radius of curvature of the second connecting surface.

4. The bearing unit according to claim 2, wherein an axial distance A from an axially inner edge of the first protrusion to an axially outer edge of the second protrusion satisfies an inequality
$$h1<A<1.1 \times h1,$$
where h1 is an axial width of the seat.

5. The bearing unit according to claim 4, wherein an axial distance D from the axially inner edge of the first protrusion to an axially outer edge of the second anchor lip satisfies an inequality:
$$2.0 \times A<D<2.1 \times A.$$

6. The bearing unit according to claim 4, wherein a radial distance C between a radially outer surface of a first cylindrical portion of the shaped metallic shield and a cylindrical surface of the second protrusion satisfies an inequality:
$$1.2 \times A<C<1.25 \times A.$$

7. The bearing unit according to claim 4, wherein a radius of curvature R1 of the first connecting surface satisfies an inequality:
$$1.4 \times A<R1<1.45 \times A.$$

8. The bearing unit according to claim 4, wherein a radius (R3) of the axially inner edge of the first protrusion is between 0.15 mm and 1.5 mm.

9. The bearing unit according to claim 4, wherein an axial distance D from the axially inner edge of the first protrusion to an axially outer edge of the second anchor lip satisfies an inequality:
$$2.0 \times A<D<2.1 \times A,$$
wherein a radial distance C between a radially outer surface of a first cylindrical portion of the shaped metallic shield and a cylindrical surface of the second protrusion satisfies an inequality:
$$1.2 \times A<C<1.25 \times A,$$
wherein a radius of curvature R1 of the concave surface satisfies an inequality:
$$1.4 \times A<R1<1.45 \times A,$$
wherein a radius of curvature R2 of the second connecting surface is between 0.15 mm and 1 mm, and
wherein a radius (R3) of the axially inner edge of the first protrusion is between 0.15 mm and 1.5 mm.

10. The bearing unit according to claim 2,
wherein the first protrusion contacts the seat at a first point,
wherein the second protrusion contacts the seat at a second point axially and radially outward of the first point,
wherein a first sealed space is defined by the first protrusion, the second protrusion and a portion of the seat between the first point and the second point.

11. The bearing unit according to claim 10, wherein the second anchor lip contacts the radially outer ring at a third point axially outward and radially inward of the second point, and wherein a second sealed space is defined by the second protrusion, the second anchor lip and a portion of the radially outer bearing ring between the second point and the third point.

12. The bearing unit according to claim 11,
wherein a radially outer portion of the second anchor lip lies radially outward of the third point.

13. The bearing unit according to claim 1,
wherein the second anchor lip sealingly contacts a radially inner surface of the radially outer ring.

14. The bearing unit according to claim 13,
wherein a radius of curvature R2 of the second connecting surface is between 0.15 mm and 1 mm.

15. The bearing unit according to claim 1,
wherein the first connecting surface is toroidal or cylindrical.

* * * * *